Aug. 11, 1970

F. W. ZILL 3,524,162

MULTIPLE ACOUSTIC RECEIVER AND TRANSMITTER
SYSTEM FOR MEASURING SONIC ATTENUATION
RATIO IN EARTH FORMATIONS

Original Filed May 13, 1966

INVENTOR.
FRED W. ZILL

BY Brumbaugh, Free,
Graves & Donohue his ATTORNEYS

INVENTOR.
FRED W. ZILL
BY
Brumbaugh, Free, Graves & Donohue
his ATTORNEYS

United States Patent Office 3,524,162
Patented Aug. 11, 1970

3,524,162
MULTIPLE ACOUSTIC RECEIVER AND TRANSMITTER SYSTEM FOR MEASURING SONIC ATTENUATION RATIO IN EARTH FORMATIONS
Fred W. Zill, Houston, Tex., assignor to Schlumberger Technology Corporation, Houston, Tex., a corporation of Texas
Continuation of application Ser. No. 551,177, May 13, 1966. This application Jan. 5, 1968, Ser. No. 696,087
Int. Cl. G01v 1/28, 1/40; H03k 5/00
U.S. Cl. 340—15.5                                   5 Claims

ABSTRACT OF THE DISCLOSURE

A system for acoustically logging formations surrounding a well bore including first and second acoustic transmitters spaced apart vertically in a sonde for transmitting acoustic energy into the formations. First and second acoustic receivers spaced apart and spaced from the transmitters are similarly carried by the sonde to produce electrical signals representing the intensity of the transmitted acoustic energy received. An electronic detector connected to receive those electrical signals generates pulses of which the duration is proportional to the logarithm of the respective electrical signals from the receivers. Those logarithmic signals are employed to control a binary counter receiving clock pulses in such a manner that a binary-to-analog converter produces an output signal representing the product of the ratios of the signal amplitudes received at each receiver from a respective transmitter. The output signal offers an acoustic attenuation indication free from errors due to the acoustic transfer coefficients between any transmitter and the receivers.

---

This application is a continuation of application Ser. No. 551,177, filed May 13, 1966, for "Sonic Signal Attenuation Measurement" now abandoned.

This invention relates to sonic attenuation measurements by which certain properties of the formations surrounding a well bore may be determined. More specifically, the invention pertains to improved apparatus and systems for measuring such sonic attenuation in which the effects of certain extraneous or unwanted parameters influencing measurement accuracy are substantially reduced or eliminated.

In well logging, it is known that certain properties may be ascribed to the formations surrounding the bore from a measure of the attenuation of acoustic energy traversing a longitudinal zone in the formations. A major problem encountered in taking such measurements, however, is the influence on attenuation of the geometry of a surface of the bore, the media between the acoustic energy source and the earth formations, as well as the direction of the lateral path of acoustic waves between the acoustic source and receiver devices, to name some of the most important factors. In general, these factors, which are largely unrelated to the attenuative properties of the earth strata, profoundly affect the actual total attenuation between acoustic transmitters and receivers. Because of this, the actual net sonic attenuation in the formations, which is the quantity of interest, is usually a small fraction of the total attenuation. In order to remove these factors, various logging signals must be processed in a prescribed manner to yield an indication of the desired net sonic attenuation.

In the past this has been often done through the use of separate calculations after the amplitudes of the several logging signals have been individually recorded. This method is severely disadvantageous where an immediate indication or direct record of net sonic attenuation is wanted.

Accordingly, it is an object of this invention to provide a logging system which is capable of measuring the sonic attenuation of acoustic signals more rapidly and to a greater degree of accuracy than achievable with known logging systems.

A further object of the invention is to provide a well logging apparatus for developing logging signals representative of the sonic attenuation through earth formations around the well bore and for processing these signals to obtain an indication of the net sonic attenuation exclusive of unwanted factors influencing sonic attenuation measuremet accuracy.

It is another object of the invention to provide an improved well logging system for taking the ratio of amplitudes of two or more acoustic logging signals.

Yet, a further object is to provide improved circuits and systems for developing signals representing logarithmic values of input signal amplitudes.

In briew, these and other objects of the invention are attained in a system using two sources of acoustic energy spaced apart longitudinally in the well bore and two acoustic receivers in longitudinal spaced-apart relation for passage with the acoustic energy sources through the well bore. The sources (acoustic transmitters) are energized to emit sonic energy waves through the longitudinal formation zone of interest. The waves attenuated by travel through the formations are sensed by the receivers which produce electrical signals corresponding to the instantaneous intensity of the received waves. These signals are then processed and compared to obtain the product of the ratios of the signal amplitudes received at each of the receivers from each transmitter.

In a preferred embodiment of the invention, the ratio product is developed by operating on the electrical signals from the receivers to produce pulses whose durations are proportional to the logarithm of the received signal amplitudes. These pulses are then used to gate constant frequency pulses from a clock to a digital counter in which the number of constant frequency pulses occurring coincidentally with a logarithmic gating pulses are added or subtracted in accordance with the relationship defined by the ratio product. The final count on the counter represents twice the natural logarithm of the desired sonic attenuation quantity through the formations.

For a better understanding of the invention and further objects and advantages thereof, reference may be made to the following detailed description of exemplary embodiments and to the drawings in which.

Figure 1:
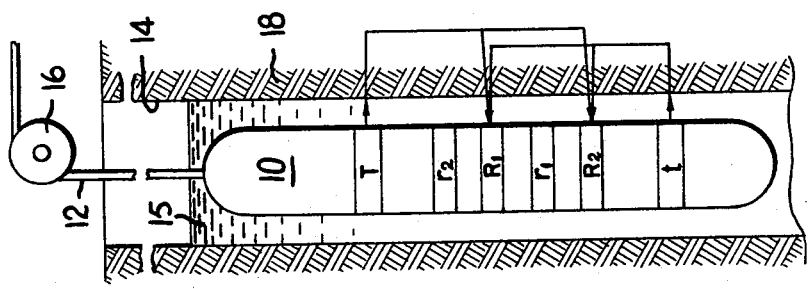
FIG. 1 is a schematic representation of a well logging tool in a bore hole, useful in explaining basic aspects of the invention.

The basic principles of operation of the present invention may be explained with reference to the diagrams of FIGS. 1 and 2. FIG. 1 illustrates a well tool or sonde 10 suspended from a cable 12 in a well bore 14 which is conventionally filled with drilling fluid 15 or mud. The cable 12, which is usually of the armored type, is fed into the well bore over a winch 16 such that the well tool 10 may be lowered or raised to the desired depth. During acoustic attenuation logging, the sonde 10 will be lowered to an initial downhole position and then pull continuously uphole so that a complete logging record of the bore will be obtained.

Located in a lower portion of the tool 10 are acoustic energy transmitters longitudinally spaced apart for transmission of acoustic energy waves into the earth formations 18 surrounding the well bore 14. Also longitudinally spaced apart and located between the transmitters T, $t$ is an array of acoustic receivers $r_2$, $R_1$, $r_1$, $R_2$ which detect the acoustic waves generated by the transmitters and develop electrical signals corresponding to variations in the acoustic wave intensity. The transmitter and receiver arrangement thus far described may be used both in accordance with the present invention and for travel time measurements as disclosed in U.S. Pat. No. 3,304,537 and assigned to the assignee of the present application. For the purpose of the present invention, it will be sufficient to limit the discussion of the sonde 10 to only two of the receivers $R_1$, $R_2$.

Figure 2A:
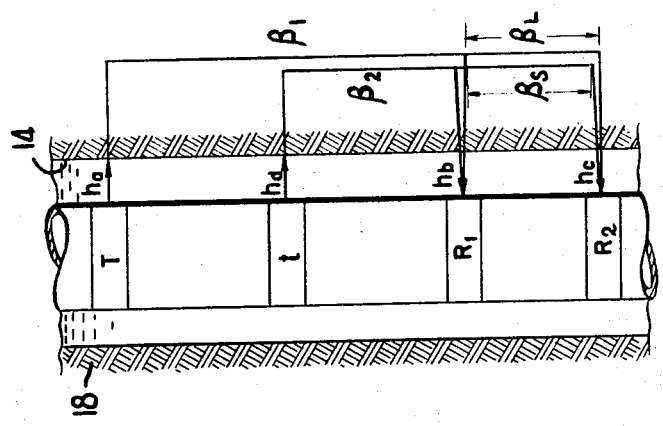
FIG. 2A is a schematic representation of an alternate form of well tool suitable for use with the invention, showing the acoustic wave paths associated therewith.
Figure 2:
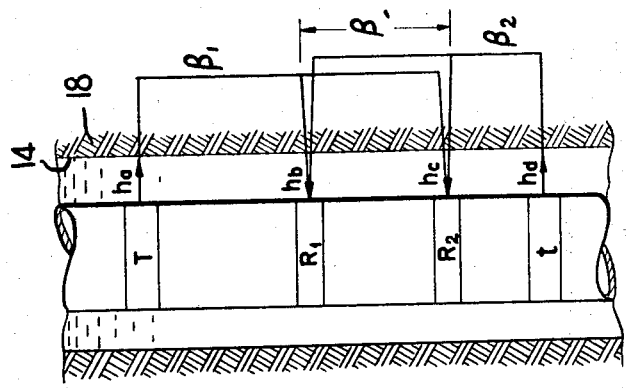
FIG. 2 is an enlarged view of a portion of FIG. 1, indicating acoustic wave paths through the formations.

As best seen in FIG. 2, sonic energy generated upon excitation of the transmitter T travels laterally through the medium 15 between the tool 10 and the wall of the bore 14 and into the formations 18, and thereafter longitudinally and radially outwardly from the transmitter through the formations. A portion of the acoustic energy thus transmitted exits from the formations 18 and returns to the bore where it is sensed by the receivers $R_1$, $R_2$, as shown diagrammatically by the arrowhead lines in FIGS. 1 and 2. Likewise, acoustic energy emanating from the lower transmitter $t$, traverses a path through the medium 15, through the earth formations 18 longitudinally of the well bore, and back into the medium 15 where its presence is detected by the same two receivers $R_2$, $R_1$.

In accordance with the invention, it is desired to measure the sonic attenuation in the longitudinal formation zone between the receivers $R_1$, $R_2$, as depicted in FIG. 2. Four separate acoustic measurements designated as $TR_1$, $TR_2$, $tR_1$, $tR_2$ are taken through the longitudinal zone over which the sonic attenuation constant is desired, where the constant is conventionally determined by comparing the amplitudes of the electrical signals developed at one or more receivers in response to acoustic energy transmitted by only one transmitter. As noted briefly above, however, the results of such a comparison are usually unsatisfactory and, at best, indicative of only the gross properties of the formations owing to the several factors influencing the total attention between a transmitter and receiver pair.

As acoustic energy is transmitted from a transmitter located in a well bore, some energy is reflected, while another portion of it is refracted upon passing into the formation. The reflective and refractive characteristics of the bore are dictated by the density and the elastic constants of the formations and of the drilling fluid. Another influencing factor on the amplitude of the sonic signal received by the receivers is the sonic radiation pattern. It is also known that the geometry of the wall of the well bore and the position of the sonde in the bore strongly affect the characteristics of transmission and reception of acoustic signals. In some instances, for example, eccentricity of the well tool in the bore may cause partial cancellation of sonic signals at the receiver, owing to the different arrival times of the acoustic waves assuming different paths through the drilling medium and the formations.

The effects of these various parameters can be largely reduced or eliminated by the transmitter and receiver arrangement shown in FIGS. 1 and 2, operating in conjunction with the logging apparatus to be described. For convenience, these parameters may be lumped into a single transfer function or transmission factor $h$ which may be assumed to be effective over a lateral portion of the acoustic energy wave path between the formations and the respective transmitters and receivers. In FIG. 2, the lumped transmission factor between the transmitters T and $t$ and the formations have been designated $h_a$ and $h_d$; $h_b$ and $h_c$ are the corresponding transfer functions between the earth formations and the receivers $R_1$ and $R_2$, respectively.

The factors $h_a$, $h_b$, $h_c$, and $h_d$ can be eliminated by taking a ratio of the acoustic signal amplitudes received at each receiver from the one of the transmitters, and multiplying this ratio by a similar ratio obtained from a comparison of acoustic signal amplitudes at these receivers from the other transmitter. The various sonic signal amplitudes corresponding to each transmitter-receiver pair are, it is recalled, designated $TR_1$, $TR_2$, $tR_1$, $tR_2$. The transmission through the longitudinal zone between the transmitter T and the receiver $R_1$ is designated $\beta_1$ and the transmission over the longitudinal zone between the transmitter $t$ and the receiver $R_2$, $\beta_2$. $\beta$ is the desired transfer function between the longitudinal zone defined between the receivers $R_1$ and $R_2$. The following equations, describing the amplitudes of the electrical signals generated by the receivers in response to the acoustic energy transmitted through the formations, may be written from inspection:

$$TR_1 = A h_a \beta_1 h_b g_1 \quad (1)$$

$$TR_2 = A h_a \beta_1 \beta h_c g_2 \quad (2)$$

$$tR_2 = A h_d \beta_2 h_c g_2 \quad (3)$$

$$tR_1 = A h_d \beta_2 \beta h_b g_1 \quad (4)$$

where A is the amplitude of the acoustic signal emitted by the transmitters and $g_1$ and $g_2$ are the transfer coefficients of the receivers $R_1$ and $R_2$, respectively, in response to the acoustic waves.

The ratio of the signal amplitudes generated by the receivers $R_2$ and $R_1$, upon detection of acoustic energy from the transmitter T is:

$$\frac{TR_1}{TR_2} = \frac{1}{\beta} \frac{h_b}{h_c} \cdot \frac{g_1}{g_2} \quad (5)$$

Similarly, the amplitude ratio of acoustic signals received at the receivers $R_1$ and $R_2$ from the transmitter $t$ is:

$$\frac{tR_2}{tR_1} = \frac{1}{\beta} \frac{h_c}{h_b} \cdot \frac{g_2}{g_1} \quad (6)$$

Multiplication of these two ratios yields:

$$\frac{TR_1}{TR_2} \cdot \frac{tR_2}{tR_1} = \frac{1}{\beta^2} \quad (7)$$

or $$\frac{\alpha}{1} = \left[ \frac{TR_1}{TR_2} \cdot \frac{tR_2}{tR_1} \right]^{1/2} \quad (8)$$

It is seen that by this relatively simple mathematical manipulation, the unwanted transfer functions $h_a$, $h_b$, $h_c$, and $h_d$ are eliminated. It is for this reason that the two-receiver, two-transmitter logging system described is superior to single receiver systems.

Equation 8 can be handled more conveniently by taking the logarithm of both sides of the equation. This yields:

$$\ln \frac{1}{\beta} = \ln \alpha = \frac{1}{2} \ln \left[ \frac{TR_1}{TR_2} \cdot \frac{tR_2}{tR_1} \right] \quad (9)$$

$$2\ln\alpha = \ln TR_1 + \ln tR_2 - \ln TR_2 - \ln tR_1 \quad (10)$$

By putting the equation in this form and processing the signals from the receivers to develop signals representing logarithm of the receiver signal amplitudes, direct addition and subtraction of the processed signals may be made to arrive at the logarithm of the sonic attenuation constant defined as $1/\beta$, which represents a number greater than 1. The term $1/\beta$ is equal to $\alpha$ and is referred to herein as the sonic attenuation constant.

FIG. 2A depicts an alternate form of transmitter-receiver array. In this configuration both transmitters T, $t$ are located above the receivers $R_1$, $R_2$ such that acoustic energy from the far transmitter T travels a longer longitudinal path through the formations to the receivers than acoustic energy from the near transmitter $t$. With the arrangement shown in FIG. 2, it can sometimes happen that the transfer functions $h_b$ and $h_c$ are not entirely cancelled due to the fact that acoustic waves do not necessarily arrive at the transmitter at right angles to the side of the bore. Although this condition does not destroy the quality of the measurement, it may, nevertheless, be advantageous to obtain an additional measurement for purposes of comparison. It is expected that useful comparative information can be obtained by logging the formations with acoustic energy traveling through the formations 18 in the same longitudinal direction, as shown in FIG. 2A. It can be predicted that the spread of sonic energy from the near and far transmitters will differ; for this reason, the transfer function $\beta_L$ for the sonic waves in the longitudinal zone between $R_1$ and $R_2$ from the transmitter T will not equal the transfer function $\beta_s$ for sonic waves in the same longitudinal zone from the receiver $t$. For the transmitter-receiver arrangements of FIG. 2A, the relevant equations for the signals developed by the receivers are:

$$TR_1 = A h_a \beta_1 h_b g_1 \qquad (11)$$

$$TR_2 = A h_a \beta_1 \beta_L h_c g_2 \qquad (12)$$

$$tR_1 = A h_d \beta_2 h_b g_1 \qquad (13)$$

$$tR_2 = A h_d \beta_2 \beta_s h_c g_2 \qquad (14)$$

Taking similar ratios between the amplitudes of these signals, the quantity $\alpha_L/\alpha_s$ may be obtained:

$$\frac{TR_1}{TR_2} = \frac{1}{\beta_L} \frac{h_b}{h_c} \cdot \frac{g_1}{g_2} \qquad (15)$$

and, $$\frac{tR_1}{tR_2} = \beta_s \frac{h_c}{h_b} \cdot \frac{g_2}{g_1} \qquad (16)$$

Thus, $$\qquad (17)$$

or, $$\frac{TR_1}{TR_2} = \frac{TR_1}{TR_2} \cdot \frac{tR_2}{tR_1} = \frac{\beta_s}{\beta_L} = \frac{\alpha_L}{\alpha_s}$$

$$\ln \alpha_L - \ln \alpha_s = (\ln TR_1 + \ln tR_2 - \ln TR_2 - \ln tR_1) \qquad (18)$$

Figure 3:
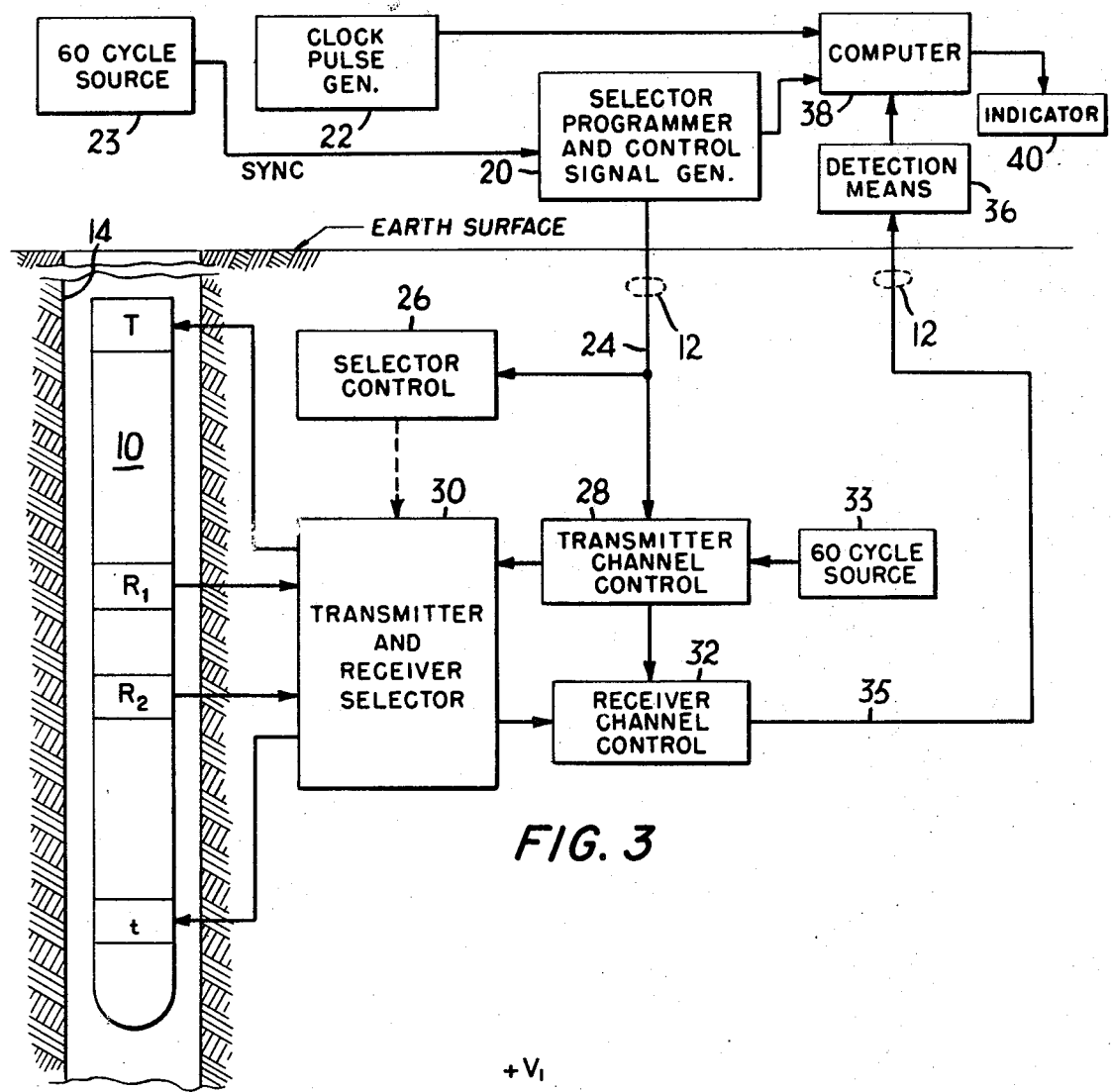
FIG. 3 is an electrical block diagram of a logging system in accordance with the invention.

FIG. 3 is a block diagram of the over-all logging system. The system includes a selector-programmer and control signal generator unit 20 at the surface which is synchronized to the 60 cycle source 23. The unit 20 produces at one of its output leads 24 coded control signals which are used to select the particular transmitter-receiver pair to be used in obtaining the individual sonic attenuation measurements. These control signals are fed through a selector control unit 26 and to a transmitter channel control unit 28.

Upon receiving the coded control signals, the selector control unit 26, which may include a series of relays, selects the proper transmitter and receiver for the particular measurement by interconnecting, through the transmitter and receiver selector 30, the respective transmitters and receivers to the transmitter channel control unit 28 and to the receiver channel control unit 32, respectively. When a first series of pulses appears on the lead 24 from the unit 20, certain of the relays in the selector control 26 are energized, thereby completing selected connections to the channel control units 28, 32 by way of the relay contacts located in the transmitter and receiver selector 30, as indicated by the dashed-line connection.

Once the selection of the desired transmitter-receiver pair has been made, the transmitter channel control unit 28, which is synchronized with the 60-cycle source 33, feeds a transmitter fire pulse to the proper transmitter in the well tool 10. The transmitter channel control unit 28 also supplies a signal to the receiver channel control unit 32 to open a path to the conductor 35 for the receiver signals shortly after the transmitter is fired. Normally, the receiver channel control 32 blocks passage of signals to the conductor 35 to prevent extraneous or spurious signals from the downhole equipment from reaching the conductor 35. Electrical signals developed by the receivers $R_1$, $R_2$ in response to acoustic energy transmitted by the selected transmitter are sequentially coupled to the receiver channel control 32 through the transmitter and receiver selector 30, and are thereafter transferred to one of the conductors 35 in the cable 12.

Traveling uphole, electrical signals from the receivers are processed through detection means 36 which puts the signals in necessary form for computation by the computer 38, in accordance with the foregoing mathematical relationships. As will be explained subsequently in detail, the detection means 36 develops a gate signal whose duration is proportional to the logarithm of the amplitude of the received electrical signals. The gate signal then controls the input of pulses from the clock pulse generator 22 to the computer where the pulses are added or subtracted in accordance with instructions received from the selector-programmer and control signal generator unit 20. The clock pulse generator may have a frequency rate such as 42 kc./sec. The computer develops an analog signal representative of $\alpha$, the sonic attenuation constant, whereafter it is displayed on an indicator 40, such as a recording galvanometer or potentiometer. Detailed descriptions of downhole equipment shown in FIG. 3 may be found in the aforementioned Pat. No. 3,304,537.

A brief explanation of the operation of the system of FIG. 3 will now be given. To start, a measurement sequence is selected by the selector-programmer and control signal generator unit 20 to yield the proper control signals to the downhole equipment. For example, the desired sequence might be: $TR_1$, $tR_1$, $TR_2$, $tR_2$. A combination of four individual measurements, in any sequence, may be practicably made at a repetition rate of 20 per second. The first group of signals on conductor 24 activates the selector control unit 26 such that the transmitter T is coupled to the transmitter channel control 28 and the receiver $R_1$ is coupled to the receiver channel control 32. Next, a fire pulse to energize the transmitter T is generated in the transmitter channel control 28, and a burst of sonic energy travels through the formations along paths such as those indicated in FIGS. 1 and 2. The intensity of the acoustic energy propagated by the transmitter T is sensed by the receiver $R_1$ which develops an electrical signal corresponding to the variations in sonic energy received thereby. Meanwhile, the receiver channel control 32 has been gated to the "on" or open position by a trigger pulse from the transmitter channel control 28, thereby connecting the receiver $R_1$ to the detection means 36. After treatment in the detection means 36, the resultant signal or signals are fed to the computer 38.

At this point in time, the receiver channel control 32 and transmitter channel control 28 are momentarily deactivated and the next series of pulses is transmitted over the lead 24 to select the transmitter $t$, the receiver $R_1$ remaining selected for the next measurement $tR_1$. Hereafter, the sequence of events is identical to that just described. In addition, a signal steering pulse is provided by the unit 20 to tell the computer 38 in which manner the signal from the detection means 36 is to be treated, i.e., as a negative or positive quantity. Similarly, the $TR_2$ and $tR_2$ signals are developed and fed through the detection means 36 to the computer 38, accompanied by the appropriate steering signal.

Figure 6:
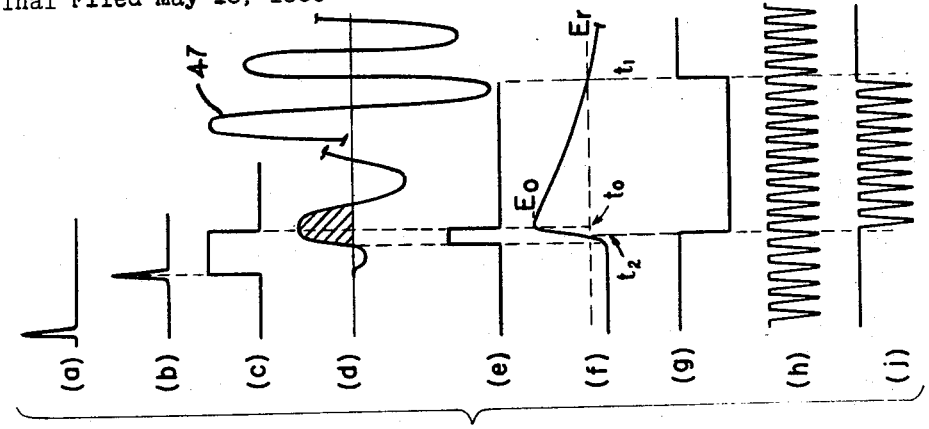
FIG. 6 is a graph of waveforms helpful in explaining the operation of the FIG. 4 system.
Figure 4:
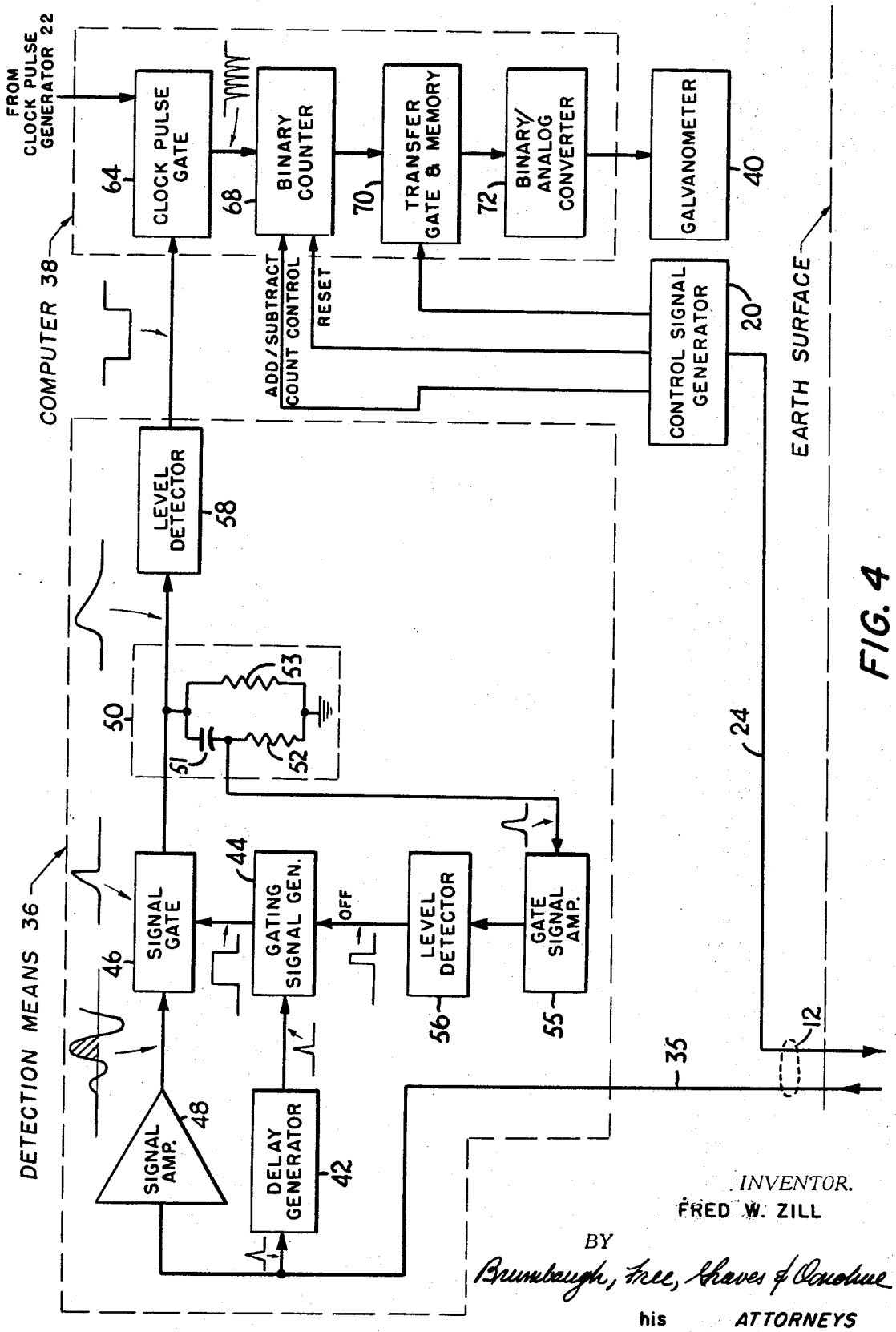
FIG. 4 is a detailed electrical block diagram of certain portions of the system shown in FIG. 3.

FIG. 4 illustrates in detail the basic elements contained in the detection means 36 and the computer 38, representative electrical signals being shown in various stages of progression for ease of understanding. FIG. 6 shows these signals on a time scale. The transmitter fire pulse (FIG. 6(a)) generated in the unit 28 and fed through the receiver channel control unit 32 to the conductor 35 passes through a pulse delay generator 42 which delays the appearance of this pulse (FIG. 6(b)) at its output. The delayed pulse activates a gating signal generator 44, which may be a bi-stable multivibrator, producing a gating pulse (FIG. 6(c)) at its output to switch the signal gate 46 to the "on" condition. The electrical signals (FIG. 6(d)) corresponding to the acoustic energy waves sensed by the receivers are amplified in the signal amplifier 48 and fed to the input terminal of the signal gate 46.

The signal gate 46 has two functions: at first, it selects a desired portion or excursion of the electrical signal whose amplitude is significant. For example, it has often been found desirable to use in acoustic logging measurements the first positive-going excursion of the compressional wave as shown by the shaded portion of the signal in graph (d) of FIG. 6 when logging compressional wave attenuation. The preceding peak of opposite polarity may also be used if desired. Alternatively, the later large peaks of the Rayleigh wave 47 may be used to log Rayleigh attenuation. Second, it restricts the passage of this signal excursion to following circuitry to only that portion of the excursion in which its amplitude is increasing. In other words, only the first half of the positive-going signal peak is admitted through the gate 46.

This portion of the electrical signal reaches a peak reader or amplitude storage circuit 50 which comprises a capacitor 51 in series with a resistor 52, and a second resistor 53 in parallel with the series capacitor-resistor circuit branch. Upon receiving the signal from the signal gate 46, the capacitor 51 charges up to the peak value $E_0$ of the signal amplitude. A voltage corresponding to the amplitude of the charging current through the capacitor 51 is developed across the resistor 52 and fed to a gate signal amplifier 55, and thereafter to a level detector 56 which develops a square wave pulse (FIG. 6(e)) having a time width equal to the duration of the charging current through resistor 52. This square pulse is then applied to the "off" trigger input to the gating signal generator 44 which may include a differentiator circuit to develop a sharp pulse at the trailing edge of the square pulse. Upon the indication of the end of the square pulse, the gate pulse at the output of the gating signal generator 44 is extinguished, thereby restricting further passage of the electrical acoustic signal to the peak reader 50.

The charging time constant of the circuit 50 is such that upon termination of the gate pulse, the capacitor 51 will have charged up to approximately the peak value $E_0$ of the signal appearing at the output of the gate 46. Thereafter, the capacitor 51 discharges through the resistor 53 over a perod determined by the time constant of these two elements. The resistor 52 has a resistance value much less than the resistor 53 such that the charging time constant of the capacitor 51 and the resistor 52 is small compared to the time for the capacitor 51 to discharge through the resistor 53. The decay period of the charge stored on the capacitor 51, and therefore of the voltage developed across the resistor 53, bears a logarithmic relation to the peak amplitude voltage $E_0$.

FIG. 6f shows the general wave shape of the signal appearing across the resistor 53 and supplied to the level detector 58. As will be explained shortly this detector senses the excursions of the above signal which exceed a reference level $E_r$ and generates a pulse of which the width corresponds to the period $t_1-t_0$ during which the signal amplitude decays from an amplitude $E_0$ to the amplitude of a reference signal level $E_r$. The time period $t_1-t_0$ is proportional to the logarithm of the amplitude ratio of $E_0/E_r$. This may be developed as follows:

Let:
$e$ = the instantaneous amplitude of the decaying signal between $t_0$ and $t_1$;
$RC=\tau$, the time constant of capacitor 51 and resistor 53;
$e=E_0$ at $t=0=t_0$;
$e=E_r$ at $t=t_1$.

Then:

$$e = E_0 \epsilon^{-t/\tau} \quad (19)$$

$$E_r = E_0 \epsilon^{-t/\tau} \quad (20)$$

$$\ln E_r = \ln E_0 - t_1/\tau$$

$$t_1/\tau = \ln E_0 - \ln E_r$$

$$t_1 = \tau \ln(E_0/E_r) = t_1 - t_0 \quad (21)$$

Figure 5:
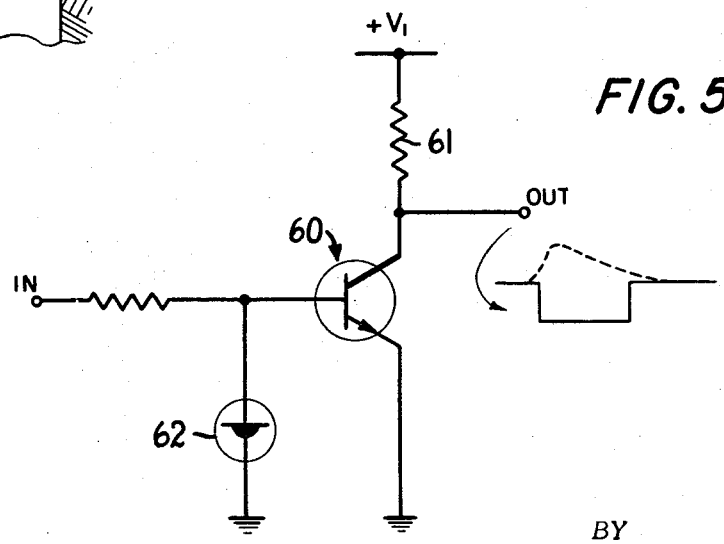
FIG. 5 is a schematic diagram of a level detecting apparatus used in the system shown in FIG 4.

The development of a pulse whose duration is proportional to this decay time is achieved in the level detector 58 which is triggered from one stable state to another as the signal from the peak level detector exceeds and returns to the reference signal level $E_r$. A representative circuit for the level detector 58 is shown in FIG. 5. This comprises a single grounded-emitter transistor stage 60 shunted by a tunnel diode 62 connected between the base of the transistor and ground. The load resistor 61 is selected so that the combined transistor and diode characteristic load line is situated to trigger the circuit into one of its stable states as the input signal from the peak reader circuit 50 crosses the reference level $E_r$. Although as seen in FIG. 6f, triggering of the level detector 58 occurs slightly prematurely of its peak value $E_0$, no appreciable error is realized because the period $t_0-t_2$ is small compared to the longer decay time $t_1-t_0$. When the signal amplitude reaches $E_r$ again, the circuit returns to its quiescent stable state. The level detector therefore produces at its output a pulse (FIG. 6g) having a duration substantially equal to the period $t_1-t_0$.

Returning to FIG. 4, the gating pulse output from the level detector 58 controls the clock pulse gate 64 to admit pulses (FIG. 6h) from the clock pulse generator 22 to the binary digital counter 68 which registers the number of clock pulses occurring in the duration of the gate signal shown in FIG. 6g. As can be observed from graph (j) in FIG. 6, this number of pulses will be proportional to the logarithm of the peak amplitude of the signal from the selected receiver, since the duration of the clock pulse gate signal (graph g in FIG. 6) is proportional to the logarithm of this amplitude. Similarly, the signals $tR_1$, $tR_2$, $TR_2$ are processed to develop gating pulses at the output of the level detector 58 proportional to their amplitudes. Since, as described by the foregoing equations, certain of the signals must be added to the accumulated count while others must be subtracted, add and subtract count control signals are provided from the control signal generator unit 20 to the binary counter 68 such that the pulse numbers corresponding to $TR_1$ and $tR_2$ are added. The pulse numbers corresponding to the logarithmic amplitudes of the signals $tR_1$ and $TR_2$, on the other hand, are subtracted in the binary counter pursuant to a subtract control signal from the unit 20. The result is a total count proportional to the desired logarithm of the sonic attenuation constant. This is shown as follows:

Let:
$n$ = number of pulses representing total count on counter 68,
$b$ = pulse rate of pulses from the clock pulse generator 22,
$t_{11}$ = duration of gating pulse corresponding to the measurement $TR_1$,
$t_{22}$ = duration of gating pulse corresponding to the measurement $tR_2$, $t_{12}$=duration of gating pulse corresponding to the measurement $TR_2$,
$t_{21}$=duration of gating pulse corresponding to the measurement $tR_1$, Then, from expression 10

$$n=b(t_{11}+t_{22}-t_{12}-t_{21}) \qquad (22)$$

Using expression 21,
$$n=b_T(\ln TR_1 - \ln E_r + \ln tR_2 - \ln E_r - \ln TR_2 \\ + \ln E_r - \ln tR_1 + \ln E_r$$

$$n=b_T(\ln TR_1 + \ln tR_2 - \ln TR_2 - \ln tR_1) \qquad (23)$$

After all four signals have been processed, the binary count of counter 68, representing $2\ln\alpha$, is transferred to memory 70. At the time of transfer, all bits are shifted one stage to divide by 2, so that the memory stores $\ln\alpha$. The total count activates a binary-analog converter, 72, to develop an analog signal representing the logarithm of the sonic attenuation constant $\alpha$. At the same time, the binary counter 68 is reset from a signal generated in the control signal generator 20. The output from the converter unit 72 drives the recording galvanometer 40, the record of which is usually mechanically connected to the winch 16, so that a continuous record of sonic attenuation is obtained as the well tool is drawn up through the well bore. Since $8.68 \ln\alpha = \alpha$ in db, the galvanometer may be calibrated to read decibels if desired.

Although, because of the ease of dealing with information in digital form, the system has been described in connection with digital equipment, it is understood that similar operations may be performed using analog techniques. For example, the peak amplitudes of the signals from the receivers may be stored or processing through analog function generators having a logarithmic transfer characteristic. The analog outputs of the function generators can then be summed or subtracted, as the case may require, to obtain the result specified in Equation 18 or 10.

I claim:
1. In systems for acoustically logging earth formations surrounding a well bore to determine the sonic attenuation of acoustic energy traveling through a longitudinal zone in the formations and including first and second transmitters arranged in longitudinally spaced apart relation for passage through the well bore and operable to emit acoustic energy into the formations, and a pair of receivers longitudinally spaced apart from one another and from the transmitters and arranged for passage with the transmitters through the well bore, each of the receivers being effective to produce first and second electrical signals corresponding to the intensity of received acoustic energy transmitted through the formations from the first and second transmitters, respectively:

a circuit responsive to the first and second electrical signals, respectively, having a dynamic transfer characteristic productive of an output signal for each electrical signal which rises to an amplitude proportional to the maximum amplitude of the respective electrical signal and which decays logarithmically with time thereafter;

level detecting means responsive to the output signal for producing an output pulse having a duration corresponding to the time during which the output signal amplitude exceeds a reference level;

gating means connected to receive the electrical receiver signals to the circuit to restrict the response of such circuit to a portion of the respective electrical signal in which its amplitude is increasing;

means connected to receive the output signal pulses for generating a series of pulse trains in which the number of pulses is proportional to the duration of each of the output signal pulses; and means for combining the pulse train signals to obtain an attenuation signal representative of the amplitude ratio of at least one of each of the first and second signals.

2. In a system for acoustically logging earth formations surrounding a well bore to determine the sonic attenuation of acoustic energy traveling through a longitudinal formation zone and including first and second transmitters arranged in longitudinally spaced apart relation for passage through the well bore and operable to emit acoustic energy into the formation zone, such system also including a pair of receivers longitudinally spaced apart from one another and from the transmitters for passage therewith through the well bore to produce first and second electrical signals corresponding to the intensity of received acoustic energy transmitted through the formation zone from the first and second transmitters, the combination therewith of:

means providing a timing signals in synchronism with the energization of each transmitter;

relay means connected to receive the timing signal for providing it to an output substantially simultaneously with the occurrence of the portion of the signal to be selected;

gating means having an input receiving the first and and second signals from the receivers and an output providing selected portions of said signals;

means responsive to the output of the gating means for developing a gating control signal, the gating means being jointly responsive to the gating control signal and the delayed timing signal for restricting the gating means output to a time interval between the occurrences thereof;

function generator means responsive to the selected portion of each electrical signal for developing an intermediate signal having a characteristic representing the logarithm of the amplitude of the selected signal portion;

level detector means connected to the function generator means and responsive to preselected levels of the intermediate signal to provide a pulse having a duration proportional to the logarithm characteristic;

pulse generator means providing a pulse train output at a reference frequency;

counter means operative to yield a numerical representative signal in response to the pulse train of the pulse generator means; and gating means controlled by pulses from the level detector means for connecting the pulse train to the counter means during such times to produce at the counter means an arithmetical combination of the gated pulses in the pulse train representing a ratio of the amplitudes of at least two of the first and second electrical signals from the receivers.

3. A system as set forth in claim 2, in which the means for developing a gating control signal comprises:

differentiator means connected to the gating means output to develop a signal whose amplitude represents the slope of the selected electrical signal at the output of the gating means; and means responsive to a preselected level of the slope-representing signal for developing the control signal.

4. Apparatus for generating a signal whose duration is proportional to the logarithm of the maximum amplitude of a selected portion of a variable amplitude input signal, comprising: a circuit responsive to the input signal and having a dynamic transfer characteristic productive of an output signal which rises to an amplitude proportional to the maximum amplitude of the input signal and which decays logarithmically with time thereafter; level detecting means responsive to the output signal for producing an output pulse whose duration corresponds to the time during which the output pulse amplitude exceeds a reference level; and gating means interposed between a source of the input signal and the circuit to restrict the response of the circuit to a portion of the input signal in which its amplitude is increasing.

5. Apparatus in accordance with claim 4 in which: the circuit includes a capacitor connected to be charged by the input signal and the gating means is activated by a control signal; the apparatus further comprising gating control means responsive to the charging current through the capacitor to develop the control signal having a duration corresponding to the duration of the charging current.

References Cited

UNITED STATES PATENTS

| | | |
|---|---|---|
| 2,590,460 | 3/1952 | Rackey et al. |
| 3,270,316 | 8/1966 | Walker et al. _____ 340—18 |
| 3,304,537 | 2/1967 | Schwartz _____ 340—18 |

RODNEY D. BENNETT, Primary Examiner

D. C. KAUFMAN, Assistant Examiner

U.S. Cl. X.R.

340—18; 181—0.5; 328—145; 324—111, 132, 119

PO-1050
(5/69)

UNITED STATES PATENT OFFICE
CERTIFICATE OF CORRECTION

Patent No. 3,524,162      Dated Aug. 11, 1970

Inventor(s)    Fred W. Zill

It is certified that error appears in the above-identified patent and that said Letters Patent are hereby corrected as shown below:

Col. 2, line 16, "measuremet" should be --measurement--; Col. 2, line 23, "briew" should be --brief--; Col. 2, line 44, "pulses" should be --pulse--;
Col. 3, line 10, "pull" should be --pulled--; Col. 3, line 33, "transimitter" should be --transmitter--; Col. 3, line 56, "attention" should be --attenuation--; Col. 4, line 16, after "from" cancel --the--; Col. 4, line 57 (Expression 8), "$\frac{\beta}{1}$" should be --$\frac{1}{\beta}$--; Col. 5, line 45, "$\frac{tR_1}{tR_2}$" should be --$\frac{tR_2}{tR_1}$--; Col. 5, line 50, cancel "or,"; Col. 5, line 53 (between Expressions (17) and (18)) insert --or--; Col. 7, line 13, "(Fig. 6(b)" should be --(Fig. 6(b))--; Col. 7, line 22, before "first" delete --at--; Col. 7, line 63, "perod" should be --period--; Col. 8, line 15, (Expression 20), "$E_r = E_0 \epsilon^{-t/\tau}$" should be --$E_r = E_0 \epsilon^{-t_1/\tau}$--; Col. 9, line 10, insert ")" at end of Expression (21); Col. 9, line 34, "or" should be --for--; Col. 10, line 19, "signals" should be --signal--; Col. 10, line 21, "relay" should be --delay--;, Col. 10, line 25, delete "and" (second occurrence).

SIGNED AND
SEALED
JAN 26 1971

(SEAL)
Attest:

Edward M. Fletcher, Jr.
Attesting Officer

WILLIAM E. SCHUYLER, JR.
Commissioner of Patents